USOO5650600A

United States Patent [19]
Walters

[11] Patent Number: 5,650,600
[45] Date of Patent: Jul. 22, 1997

[54] HORN SWITCH FOR AIR BAG MODULE

[75] Inventor: Gary A. Walters, Gilbert, Ariz.

[73] Assignee: TRW Inc., Lydhurst, Ohio

[21] Appl. No.: 457,975

[22] Filed: Jun. 1, 1995

[51] Int. Cl.$^6$ ................................................. H01H 9/00
[52] U.S. Cl. ................................................. 200/61.54
[58] Field of Search ........................... 200/61.54–61.57;
280/728.1, 728.2, 731

[56] References Cited

U.S. PATENT DOCUMENTS

| | | | |
|---|---|---|---|
| 4,581,508 | 4/1986 | Shanklin et al. | 200/61.54 |
| 4,789,763 | 12/1988 | Nagata et al. | 200/61.54 |
| 4,872,364 | 10/1989 | Kaga et al. | 74/484.8 H |
| 5,239,147 | 8/1993 | Allard et al. | 200/61.54 |
| 5,283,404 | 2/1994 | Prescaro, Jr. | 200/61.54 |
| 5,350,190 | 9/1994 | Szigethy | 280/728 A |
| 5,508,482 | 4/1996 | Martin et al. | 200/61.55 |

Primary Examiner—Michael L. Gellner
Assistant Examiner—Michael A. Friedhofer
Attorney, Agent, or Firm—Tarolli, Sundheim, Covell, Tummino & Szabo

[57] ABSTRACT

An air bag module (18) mounted on a vehicle steering wheel (12) includes an electrically conductive base plate (30). An electrically conductive member (60) is fixed to the steering wheel (12). A resilient member (80) supports the module (18) on the steering wheel (12) for movement toward the electrically conductive member (60). Bolts (100, 120), which secure the resilient member (80) to the module (18), are engageable with the electrically conductive member (60) on the steering wheel (12) to complete an electric circuit to operate a vehicle horn (50).

16 Claims, 3 Drawing Sheets

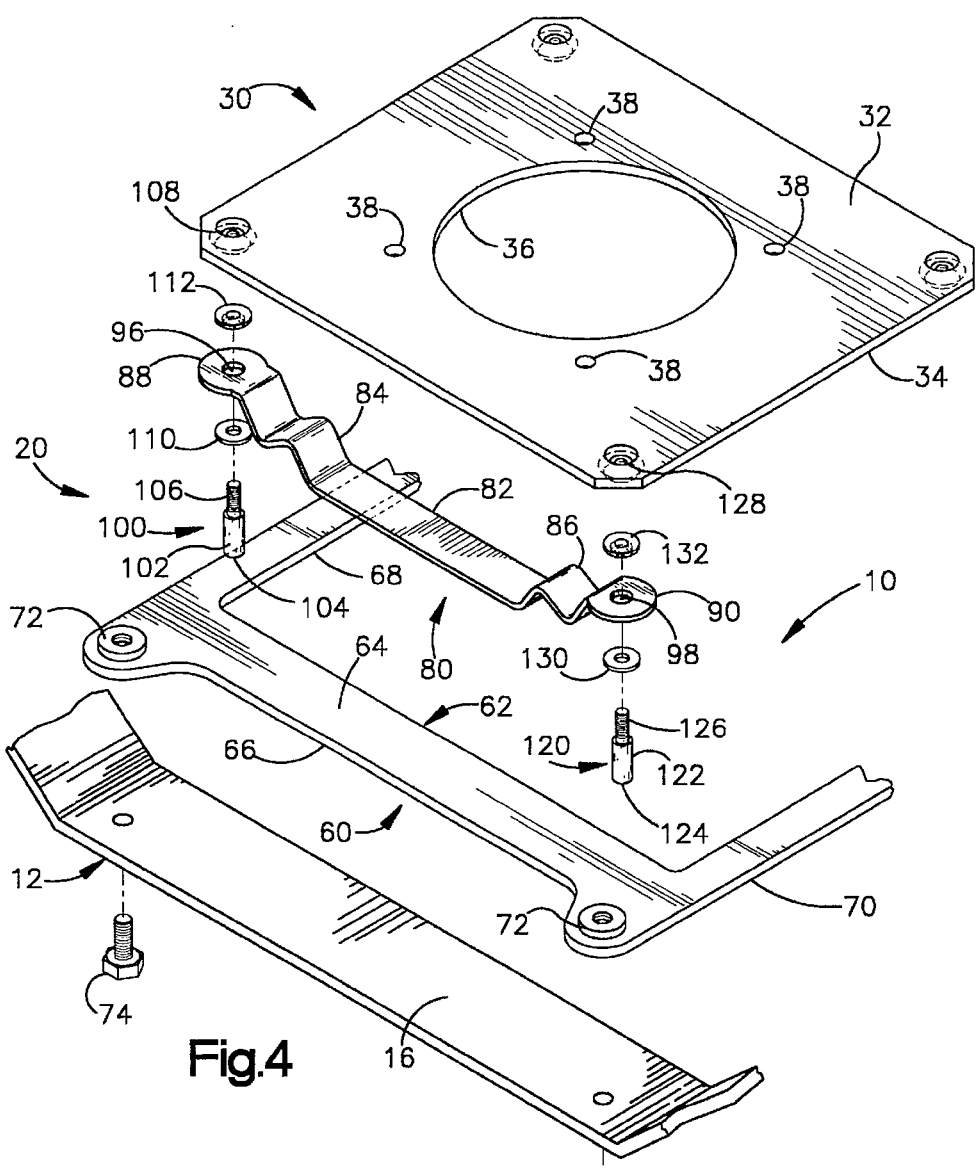
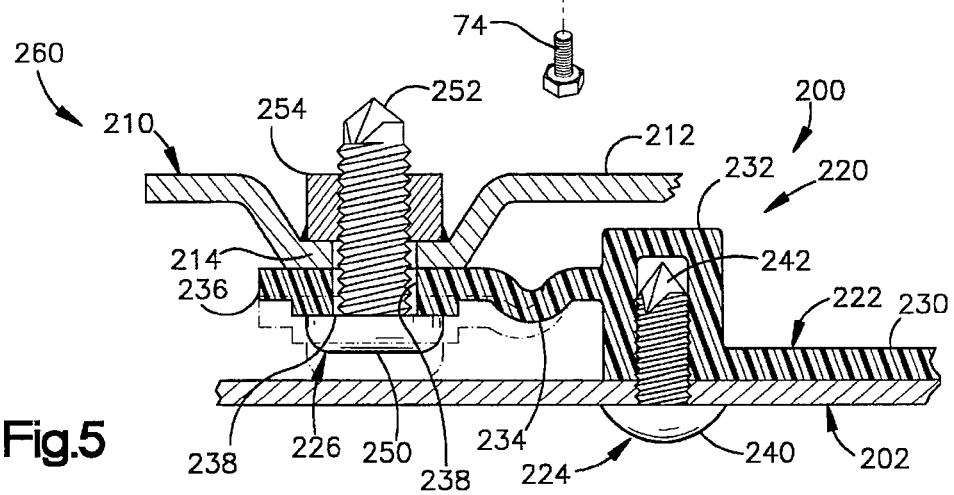

HORN SWITCH FOR AIR BAG MODULE

BACKGROUND OF THE INVENTION

1. Technical Field

The present invention relates to a horn switch assembly for a vehicle steering wheel on which an air bag module is mounted.

2. Description of the Prior Art

It is known to mount an air bag module in the center of the steering wheel of a vehicle to protect the driver of the vehicle. The air bag module includes an air bag and an inflator. In the event of sudden vehicle deceleration of a magnitude which requires protection of the driver, the inflator is actuated to inflate the air bag into a position to protect the driver of the vehicle.

It is desirable for the driver of a vehicle to be able to operate the vehicle horn by pressing at or near the center of the steering wheel. It is known to provide a horn switch which is operable by pressing on an air bag module which is mounted on a vehicle steering wheel.

SUMMARY OF THE INVENTION

The present invention is an apparatus comprising a vehicle steering wheel, an electrically conductive member on the steering wheel, and an air bag module manually engageable by the driver of the vehicle to effect operation of a horn of the vehicle. The air bag module includes an electrically conductive base plate. A resilient member supports the air bag module on the steering wheel for movement relative to the steering wheel. The resilient member supports the base plate of the air bag module for movement from a first position to a second position in which the base plate is electrically connected with the electrically conductive member on the steering wheel. This electrical connection between the base plate and the electrically conductive member on the steering wheel enables electric current to flow between the base plate of the air bag module and the electrically conductive member on the steering wheel to effect operation of the vehicle horn.

In a preferred embodiment of the invention, at least one electrically conductive bolt secures the resilient member to the air bag module. The bolt is engageable with the electrically conductive member on the steering wheel to enable electric current to flow between the bolt and the electrically conductive member on the steering wheel to effect operation of the vehicle horn.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is an exploded perspective view of parts of the horn switch assembly of FIG. 1; and FIG. 5 is an enlarged view showing a portion of a horn switch assembly which is constructed in accordance with a second embodiment of the present invention.

DESCRIPTION OF PREFERRED EMBODIMENTS

Figure 1:
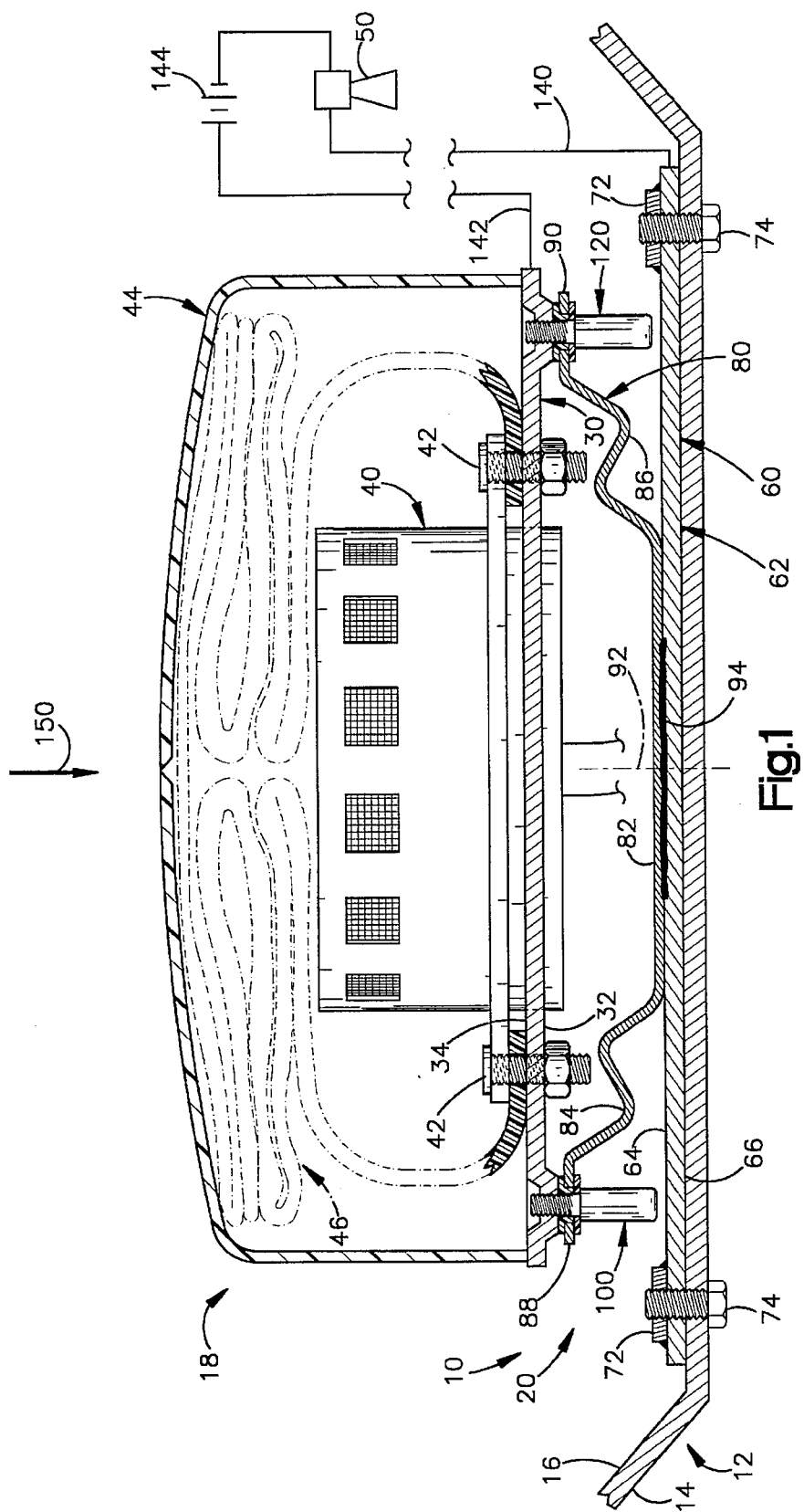
FIG. 1 is a schematic view partially in section showing a horn switch assembly for a vehicle steering wheel on which an air bag module is mounted.

The present invention relates to a horn switch assembly and, particularly, to a horn switch assembly for a vehicle steering wheel on which an air bag module is mounted. As representative of the present invention, FIG. 1 illustrates a horn switch assembly 10.

The horn switch assembly 10 is mounted on a vehicle steering wheel, a portion of which is shown at 12. The steering wheel portion 12 has an inner side surface 14 and an outer side surface 16. An air bag module 18 is supported by a resilient mounting mechanism 20 on the steering wheel portion 12.

The air bag module 18 includes a base plate 30 which is made from an electrically conductive material, preferably steel or aluminum. The base plate 30 has a generally planar, rectangular configuration including parallel inner and outer side surfaces 32 (FIG. 1) and 34. The base plate 30 has a central opening 36 (FIG. 4) and a plurality of fastener openings 38 spaced apart around the central opening.

An inflator 40 (FIG. 1) forms a part of the air bag module 18 and is supported with fasteners 42 in a known manner on the base plate 30. The air bag module 18 further includes a cover 44, which is supported on the base plate 30, and an air bag 46. The air bag 46 is secured by the fasteners 42 to the base plate 30, and is folded and stored within the cover 44 together with the inflator 40. The inflator 40 is actuatable in a known manner to inflate the air bag 46 to protect the driver of the vehicle.

The resilient mounting mechanism 20 (FIGS. 1, 2, and 4) includes a first electrically conductive member or fixed member 60, preferably made from metal, which is connected to the steering wheel portion 12 for movement with the steering wheel. The fixed member 60 forms a part of the horn switch assembly 10. The fixed member 60 is illustrated as having a rectangular ring-shaped configuration but could have another configuration suitable for the particular design of the steering wheel portion 12 and the air bag module 18.

A first end portion 62 of the fixed member 60 has an outer side surface 64 and an inner side surface 66. Two parallel and spaced apart connector portions 68 and 70 (FIG. 4) of the fixed member 60 extend from the first end portion 62 to a second end portion (not shown). The second end portion is a mirror image of the first end portion and is disposed at the opposite end of the mounting mechanism 20 and of the air bag module 18. A pair of nuts 72 are welded to the first end portion 62 of the fixed member 60. A pair of bolts 74 are screwed into the nuts 72 to secure the first end portion 62 of the fixed member 60 to the steering wheel portion 12. The fixed member 60 is thus fixed for movement with the vehicle steering wheel portion 12.

The fixed member 60 could alternatively be constructed as two separate pieces, each comprising only an end portion like the first end portion 62, rather than as one piece. Also, if the air bag module 18 has a generally rectangular configuration as shown, the first end portion 62 of the fixed member 60 could extend along either a long side or a short side of the air bag module. The fixed member 60 could alternatively be a part of, or be made as one piece with, the vehicle steering wheel.

The mounting mechanism 20 also includes a resilient member 80 (FIG. 4) which is connected between the fixed member 60 and the base plate 30 of the air bag module 18. The resilient member 80 forms a part of the horn switch assembly 10. The resilient member 80 is a formed sheet metal piece having a planar central portion 82, planar first and second end portions 88 and 90 and first and second curved connector portions 84 and 86 that join the central portion to the end portions. The resilient member 80 is symmetrical about a center line 92 as viewed in FIG. 1.

The central portion 82 of the resilient member 80 is welded at 94 to the fixed member 60 of the mounting mechanism 20. The resilient member 80 and the fixed member 60 could, alternatively, be adhesively bonded together or could possibly be formed as one piece. It is not necessary that there be an electrical connection between the resilient member 80 and the fixed member 60.

Figure 2:
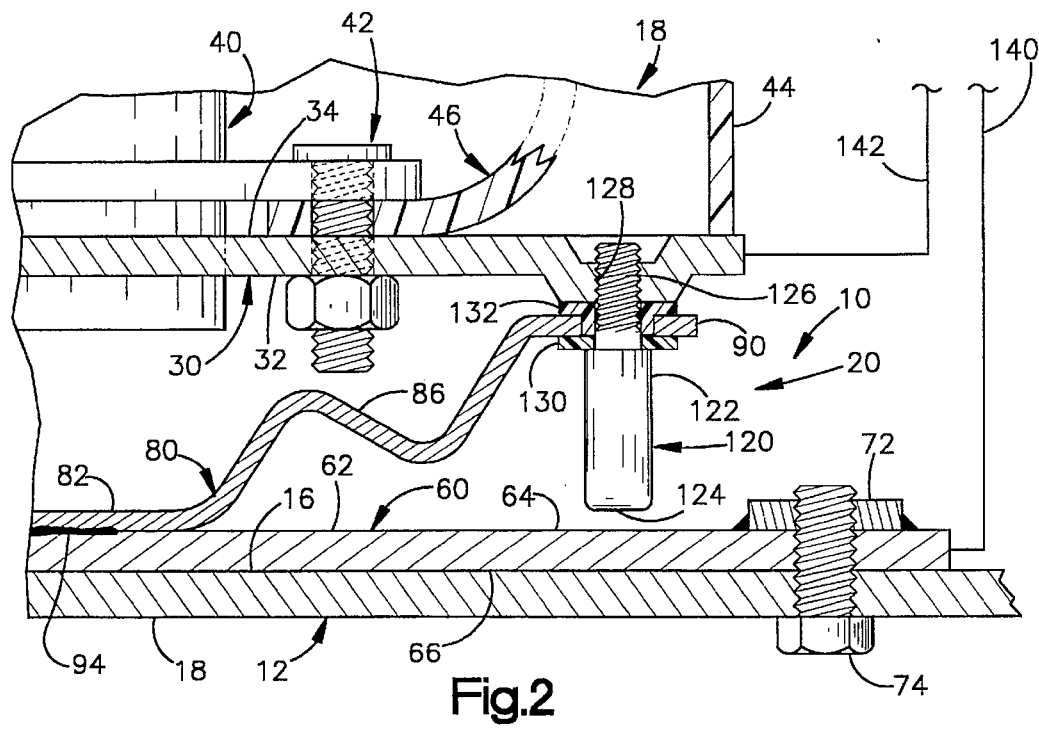
FIG. 2 is an enlarged view of a portion of FIG. 1 showing the horn switch assembly in an unactuated condition.

The first end portion 88 of the resilient member 80 extends generally parallel to the central portion 82 when the horn switch assembly 10 is in the unactuated condition illustrated in FIGS. 1 and 2. The first end portion 88 has a fastener opening 96.

The first connector portion 84 of the resilient member 80 interconnects the central portion 82 and the first end portion 88. The first connector portion 84 is resilient and has a preformed configuration adapted to flex between an unactuated condition shown in FIGS. 1 and 2 and an actuated condition shown in FIG. 3. The resilience of the first connector portion 84 enables repeated relative movement between the first end portion 88 and the central portion 82 of the resilient member 80, in a direction generally perpendicular to the plane of the central portion.

The second end portion 90 (FIG. 4) of the resilient member 80 is a mirror image of the first end portion 88 and has a fastener opening 98. The second connector portion 86 is a mirror image of the first connector portion 84 and interconnects the central portion 82 and the second end portion 90 of the resilient member 80. The second connector portion 86 is resilient and has a preformed configuration adapted to flex between an unactuated condition shown in FIGS. 1 and 2 and an actuated condition shown in FIG. 3. The resilience of the second connector portion 86 of the resilient member 80 enables repeated relative movement between the central portion 82 and the second end portion 90, in a direction generally perpendicular to the plane of the central portion.

The mounting mechanism 20 also includes first and second bolts 100 and 120 which secure the resilient member 80 to the air bag module 18. The bolts 100 and 120 form a part of the horn switch assembly 10. The first bolt 100 (FIGS. 1–4) is made from an electrically conductive material such as steel. The first bolt 100 has a head portion 102 (FIG. 4) with an outer end surface 104 and a threaded shank portion 106. The shank portion 106 of the first bolt 100 extends through the fastener opening 96 in the first end portion 88 of the resilient member 80 and is screwed into a threaded bolt hole 108 in the base plate 30 of the air bag module 18. The first bolt 100 is thereby electrically connected with the base plate 30. The outer end surface 104 of the first bolt 100 is presented toward the fixed member 60.

A pair of annular insulators 110 and 112 (FIG. 4) electrically insulate the first bolt 100 from the resilient member 80 and also electrically insulate the first end portion 88 of the resilient member from the base plate 30. As a result, the first bolt 100 is electrically connected with the base plate 30 of the air bag module 18, while the first bolt and the base plate of the air bag module are both electrically insulated from the resilient member 80.

A second bolt 120, identical to the first bolt 100, connects the second end portion 90 of the resilient member 80 for movement with the base plate 30. The second bolt 120 (FIGS. 1–4) has a head portion 122 with an outer end surface 124 presented toward the fixed member 60. A threaded shank portion 126 of the first bolt 120 extends through the fastener opening 98 (FIG. 4) in the second end portion 90 of the resilient member 80. The shank portion 126 of the second bolt 120 is screwed into a threaded bolt hole 128 (FIGS. 1 and 3) in the base plate 30 of the air bag module 18. The second bolt 120 is thus electrically connected with the base plate 30.

A pair of annular insulators 130 and 132 electrically insulate the second bolt 120 from the resilient member 80 and also electrically insulate the second end portion 90 of the resilient member from the base plate 30. As a result, the head portion 122 of the second bolt 120 is electrically connected with the base plate 30 of the air bag module 18, while the second bolt and the base plate of the air bag module are both electrically insulated from the resilient member 80.

A first lead wire or other known type of electrical connector 140 (FIG. 1) is electrically connected with the fixed member 60 on the steering wheel portion 12. A second lead wire or other known type of electrical connector 142 is electrically connected with the base plate 30 of the air bag module 18. The lead wires 140 and 142 connect the horn switch assembly 10 with the vehicle horn 50 and also with a power source 144 such as the vehicle battery.

Figure 3:
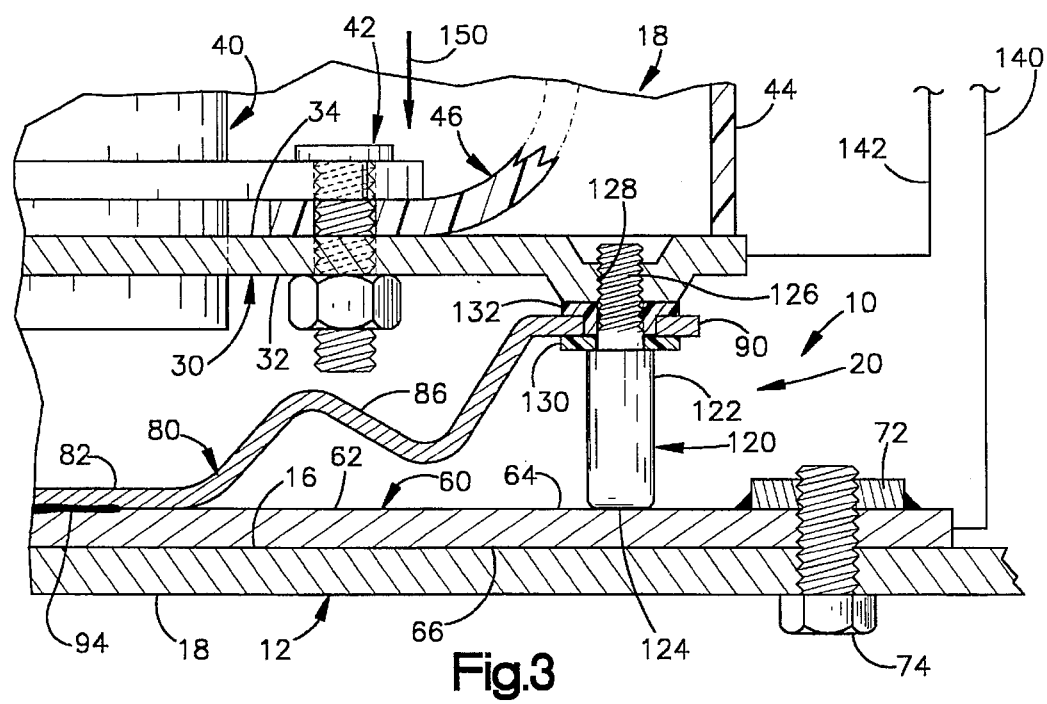
FIG. 3 is a view similar to FIG. 2 showing the horn switch assembly in an actuated condition.

To effect operation of the vehicle horn 50, the driver of the vehicle presses on the cover 44 of the air bag module 18 in a direction indicated by the arrow 150 in FIGS. 1 and 3. The force applied to the cover 44 of the air bag module 18 is transmitted through the cover to the base plate 30 and thereby to the resilient member 80. The flexibility of the connector portions 84 and 86 of the resilient member 80 enables the base plate 30 to move toward the fixed member 60 and generally toward the steering wheel portion 12.

As the connector portions 84 and 86 of the resilient member 80 flex, the horn switch assembly 10 moves from the unactuated condition shown in FIGS. 1 and 2 to the actuated condition shown in FIG. 3. The outer end surface 124 of the second bolt 120 engages the outer side surface 64 of the fixed member 60. This engagement enables electric current to flow between the second bolt 120 and the fixed member 60. The outer end surface 104 (FIG. 4) of the first bolt 100 engages the outer side surface 64 of the fixed member 60 enabling electric current to flow between the first bolt and the fixed member.

Because the first bolt 100 and the second bolt 120 are electrically connected with the base plate 30 of the air bag module 10, the engagement of the first and second bolts with the fixed member 60 establishes an electrical connection between the base plate and the fixed member. As a result, a complete electric circuit is formed between the lead wires 140 and 142. The electric circuit includes the base plate 30, the bolts 100 and 120, and the fixed member 60. The completion of this electric circuit energizes the vehicle horn 50.

When the force on the cover 44 of the air bag module 18 is released, the resilience of the connector portions 84 and 86 of the resilient member 80 causes the air bag module to move away from the steering wheel portion 12, to the position shown in FIGS. 1 and 2. As this movement occurs, the first bolt 100 and the second bolt 120 move out of engagement with the fixed member 60. Thus, the bolts 100 and 120 are electrically disconnected from the fixed member 60. As a result, the electric circuit between the lead wires 140 and 142 is broken, and the horn 50 is no longer energized.

FIG. 5 illustrates a portion of a horn switch assembly 200 which is constructed in accordance with a second embodiment of the present invention. The horn switch assembly 200 includes an electrically conductive member 202, preferably made from steel or aluminum, which is mounted on a vehicle steering wheel (not shown) for movement with the steering wheel. An air bag module base plate 210 is made from an electrically conductive material such as metal. The base plate 210 may be the same as or similar to the base plate 30 illustrated in FIGS. 1–4. The base plate 210 as illustrated in FIG. 5 has a generally planar main body portion 212 and a recessed mounting portion 214.

A resilient mounting mechanism 220 resiliently supports the base plate 210 on the fixed member 202. The mounting mechanism 220 includes a resilient member 222, one or more screws 224 for securing the resilient member to the fixed member 202, and one or more bolts 226 for securing the resilient member to the base plate 210.

The resilient member 222 is made from an electrically insulating material such as molded plastic. A first portion 230 of the resilient member 222 overlies the fixed member 202. A boss 232 projects upward (as viewed in FIG. 5) from the main body portion 230. A resilient portion 234 of the resilient member 222 extends outward from the boss 232 and supports an end portion 236 of the resilient member. The end portion 236 has a fastener opening 238 for receiving the bolt 226.

The screw 224 has a head portion 240 and a threaded shank portion 242 which extends through an opening in the fixed member 202. The screw 224 is screwed into the boss 232 of the resilient member 222. The screw 224 thus secures the resilient member 222 to the fixed member 202.

The bolt 226 has a head portion 250 and a threaded shank 252. The shank 252 extends through the opening 238 in the end portion 236 of the resilient member 222 and through the recessed mounting portion 214 of the base plate 210. A nut 254 screwed onto the bolt 226 connects the end portion 236 of the resilient member 222 for movement with the base plate 210.

The base plate 210 and the fixed member 202 are each connected by lead wires (not shown) to a vehicle horn such as the horn 50 (FIG. 1) to effect operation of the vehicle horn. Because the resilient member 222 is made from an electrically insulating material, the base plate 210 and the bolt 226 are each electrically insulated from the fixed member 202 when the horn switch assembly 200 is in the unactuated condition shown in solid lines in FIG. 5. In this unactuated condition, no electric current can flow between the bolt 226 and the fixed member 202 to actuate the vehicle horn.

When the driver presses on the air bag module so as to urge the base plate 210 in a direction toward the fixed member 202, the resilient portion 234 of the resilient member 222 bends. The bolt 226 moves in a downward direction as viewed in FIG. 5 until the head 250 of the bolt 226 engages the fixed member 202 as shown in dot-dash lines in FIG. 5. An electric circuit is completed between the base plate 210, the bolt 226, and the fixed member 202. Electric current can flow through the horn switch assembly 260 to effect operation of the vehicle horn. When the driver releases the force on the air bag module 10, the resilient member 222 causes the horn switch assembly 200 to return to the unactuated condition shown in solid lines in FIG. 5.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:

a vehicle steering wheel;

a first electrically conductive member on said steering wheel;

an air bag module manually engageable by a driver of a vehicle to effect operation of a horn of the vehicle;

a second electrically conductive member on said air bag module;

a resilient member supporting said air bag module on said steering wheel for movement relative to said first electrically conductive member on said steering wheel; and at least one electrically conductive bolt securing said resilient member to said second electrically conductive member on said air bag module;

said resilient member supporting said bolt for movement into engagement with said first electrically conductive member on said steering wheel upon engagement of said air bag module by the driver of the vehicle, to enable electric current to flow between said bolt and said first electrically conductive member on said steering wheel to effect operation of the vehicle horn.

2. An apparatus as set forth in claim 1 wherein said resilient member is made from an electrically insulating material, said bolt passing through said electrically insulating material of said resilient member, said resilient member being in abutting engagement with said first electrically conductive member on said steering wheel, said resilient member blocking flow of electric current between said bolt and said first electrically conductive member on said steering wheel prior to engagement of said air bag module by the driver of the vehicle.

3. An apparatus as set forth in claim 1 wherein said second electrically conductive member on said air bag module comprises a base plate of said air bag module.

4. An apparatus as set forth in claim 3 wherein said base plate comprises a generally planar metal member, said bolt being screwed into said base plate, said resilient member being electrically conductive and being electrically insulated from said bolt and from said base plate.

5. An apparatus as set forth in claim 1 wherein said resilient member is made from an electrically conductive material.

6. An apparatus as set forth in claim 5 wherein said resilient member is a metal member having a first portion which is electrically connected with said first electrically conductive member on said steering wheel, a second portion which is connected with but electrically insulated from said second electrically conductive member on said air bag module, and a connector portion extending between and interconnecting said first and second portions, said connector portion having a preformed configuration and resilient by supporting said second portion of said metal member for movement with said bolt relative to said first electrically conductive member on said steering wheel.

7. An apparatus as set forth in claim 1 further comprising lead wire means for electrically connecting said first electrically conductive member on said steering wheel and said bolt with the vehicle horn.

8. An apparatus as set forth in claim 1 wherein said resilient member is made from an electrically conductive material having a first portion which is electrically connected with said first electrically conductive member on said steering wheel, a second portion which is connected with but electrically insulated from said second electrically conductive member on said air bag module, and a connector portion extending between and interconnecting said first and second portions, said connector portion having a preformed configuration and resiliently supporting said second portion of said resilient member for movement with said bolt relative to said first electrically conductive member on said steering wheel.

9. An apparatus as set forth in claim 8 wherein said second electrically conductive member on said air bag module comprises a base plate of said air bag module, said bolt being screwed into said base plate, said resilient member being electrically insulated from said bolt and from said base plate.

10. An apparatus as set forth in claim 1 further comprising insulator means for electrically insulating said bolt from said resilient member and for electrically insulating said resilient member from said second electrically conductive member.

11. An apparatus comprising:

a vehicle steering wheel;

an electrically conductive member on said steering wheel;

an air bag module manually engageable by a driver of a vehicle to effect operation of a horn of the vehicle, said air bag module including an electrically conductive base plate;

a resilient member supporting said air bag module on said steering wheel for movement relative to said electrically conductive member on said steering wheel;

said resilient member supporting said base plate of said air bag module for movement from a first position to a second position in which said base plate is electrically connected with said electrically conductive member on said steering wheel, to enable electric current to flow between said base plate of said air bag module and said electrically conductive member on said steering wheel to effect operation of the vehicle horn; and at least one electrically conductive fastener extending through an opening in said resilient member and connecting said resilient member with said base plate, said fastener being engageable with said electrically conductive member on said steering wheel when said base plate is in the second position.

12. An apparatus as set forth in claim 11 further comprising at least one electrically conductive bolt securing said resilient member to said base plate, said bolt having a surface portion movable into abutting engagement with said electrically conductive member on said steering wheel to enable electric current to flow between said base plate of said air bag module and said electrically conductive member on said steering wheel to effect operation of the vehicle horn.

13. An apparatus as set forth in claim 12 wherein said bolt extends through said resilient member and further comprising insulator means for electrically insulating said resilient member from said bolt and from said base plate.

14. An apparatus as set forth in claim 11 wherein said air bag module includes a cover supported on said base plate, said cover being manually engageable by the driver of the vehicle, said cover transmitting force from the driver to said base plate to move said base plate toward said steering wheel upon engagement of said cover by the driver of the vehicle.

15. An apparatus as set forth in claim 11 wherein said resilient member comprises a piece of sheet metal having a flexible connector portion which has a preformed configuration and is resiliently flexible to enable movement of said base plate relative to said electrically conductive member on said steering wheel.

16. An apparatus as set forth in claim 11 wherein said resilient member is made from an electrically insulating material.

* * * * *